(12) United States Patent
Stavermann

(10) Patent No.: US 6,196,574 B1
(45) Date of Patent: *Mar. 6, 2001

(54) COVERING FOR AN AIR BAG RETAINING DEVICE OF A MOTOR VEHICLE

(75) Inventor: Joerg Stavermann, Munich (DE)

(73) Assignee: Bayerische Motoren Werke Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,234

(22) Filed: Mar. 3, 1999

(30) Foreign Application Priority Data

| Mar. 3, 1998 | (DE) | 198 08 910 |
| Sep. 28, 1998 | (DE) | 198 44 319 |

(51) Int. Cl.$^7$ .................................................. B60R 21/20
(52) U.S. Cl. ..................... 280/728.3; 280/731; 280/732
(58) Field of Search ............................... 280/728.3, 728.1, 280/731, 732

(56) References Cited

U.S. PATENT DOCUMENTS

| 5,460,401 | 10/1995 | Gans et al. | 280/728.3 |
| 5,533,746 | 7/1996 | Whited | 280/728.2 |
| 5,544,912 | 8/1996 | Sommer | 280/728.3 |
| 5,613,701 | * | 3/1997 | Bentley et al. | 280/728.2 |
| 5,813,693 | * | 9/1998 | Gordon et al. | 280/728.3 |
| 6,045,154 | * | 4/2000 | Walton et al. | 280/728.3 |

FOREIGN PATENT DOCUMENTS

| 70 39 407 | 10/1972 | (DE) . |
| 43 15 853 | 11/1994 | (DE) . |
| 44 42 543 | 1/1996 | (DE) . |
| 195 30 346 | 2/1996 | (DE) . |
| 196 33 109 | 2/1997 | (DE) . |
| 364714 | * 4/1990 | (EP) ................................. 280/728.3 |
| 0 722 862 | 7/1996 | (EP) . |
| 0 846 600 | 6/1998 | (EP) . |
| 0 849 125 | 6/1998 | (EP) . |
| 98/56620 | 12/1998 | (WO) . |

\* cited by examiner

Primary Examiner—Eric Culbreth
(74) Attorney, Agent, or Firm—Evenson, McKeown, Edwards & Lenahan, P.L.L.C.

(57) ABSTRACT

A covering for an air bag retaining device of a motor vehicle with a vehicle body, having a lid which, after the air bag retaining device is triggered, is pushed open by an air bag toward the motor vehicle interior. The lid is held by at least one hinge strap connected with the lid at least along a section of its opening movement on a defined moving path with respect to the vehicle body. The hinge strap is mounted to a body-fixed fastening point on the motor vehicle and on the lid. Prior to deployment of the air bag, the hinge strap extends between the air bag retaining device and the lid to an outlet point or to a mounting point on the lid. The outlet point or mounting point, viewed essentially in the longitudinal direction of the vehicle, is situated on a half of the lid farther removed from a windshield on a side of the lid facing away from the motor vehicle interior.

7 Claims, 9 Drawing Sheets

COVERING FOR AN AIR BAG RETAINING DEVICE OF A MOTOR VEHICLE

BACKGROUND AND SUMMARY OF THE INVENTION

This application claims the priority of German patents 198 08 910.4 filed Mar. 3, 1998 and 198 44 319.6 filed Sep. 28, 1998.

The invention relates to a covering for an air bag retaining device of a motor vehicle.

German Patent Document DE 41 37 926 A1 describes an air bag covering in an instrument panel, which consists of two layers, one layer being a closing element made of an elastomer foam layer which is connected with the other layer with a melt-type adhesive. This air bag covering is connected with the dashboard by way of a band-shaped joint.

Such a connection, as illustrated in FIGS. 2 and 3 of German Patent Document DE 41 37 926 A1 by way of screws or rivets, which extend transversely with respect to the direction of the force, when the air bag covering is pushed open by the air bag, has only a low mechanical stability. In addition, the mounting of such an air bag covering is very difficult and cumbersome because it has to be positioned for this purpose and little space will then remain for the tool. Furthermore, the inflation of the air bag may be hindered by the air bag covering.

It is therefore an object of the invention to provide a covering for an air bag retaining device of a motor vehicle which is pushed upon toward the interior of the motor vehicle by an air bag and is held on a defined moving path by at least one hinge strap at least along a section of its opening movement, in which case the connection of the covering to the motor vehicle is easily mountable and the inflation of the air bag is not hindered by the covering.

This and other objects have been achieved according to the present invention by providing a covering for an air bag retaining device of a motor vehicle, comprising: a structure defining an opening behind which the air bag retaining device is to be mounted, said structure being located proximate a windshield of the vehicle; a lid arranged to cover said opening in a closed position, said lid to be displaced from said closed position by an air bag to be inflated from the air bag retaining device; at least one hinge strap coupled to the lid and coupled to a fixed location behind said opening, wherein when the lid is in said closed position, the hinge strap extends between the air bag retaining device and the lid to an outlet point or to a mounting point on the lid which point, viewed essentially in the longitudinal direction of the vehicle, is situated on a half of the lid farther removed from the windshield on a side of the lid facing away from a motor vehicle interior.

This and other objects have been achieved according to the present invention by providing a covering for an air bag retaining device of a motor vehicle, comprising: a structure defining an opening behind which the air bag retaining device is to be mounted; a lid arranged to cover said opening in a closed position, said lid to be displaced from said closed position by an air bag to be inflated from the air bag retaining device; at least one hinge strap coupled to the lid and coupled to a fixed location behind said opening, said at least one hinge strap including an unrestrained portion extending between said fixed location and a point of engagement located on a first half of said lid, wherein when said lid is in said closed position, said unrestrained portion extends from said point of engagement, between an interior side of the lid and the air bag retaining device to an intermediate location between said air bag retaining device and a second half of said lid, and from said intermediate location to said fixed location.

According to the invention, a covering for an air bag retaining device of a motor vehicle with a vehicle body, having a lid which, after the air bag retaining device has been triggered, is pushed open by an air bag toward an interior of the motor vehicle and is held by at least one hinge strap. The hinge strap is connected with the lid, at least along a section of its opening movement on a defined movement path with respect to the vehicle body because the hinge strap is mounted at a vehicle-body-fixed fastening point on the motor vehicle and on the lid. Prior to deployment of the air bag, the hinge strap extends between the air bag retaining device and the lid to an outlet point or to a mounting point on the lid. The outlet point or mounting point, viewed essentially in the longitudinal direction of the vehicle, is situated on a half of the lid farther removed from the windshield on a side of the lid facing away from the motor vehicle interior.

This has the advantage that the hinge strap is relatively long. Therefore, the lid connected with it, when the hinge strap is mounted to the vehicle-body-fixed fastening point, can be deposited at a point where it does not hinder the fitter, for example, on the dashboard. As the result of the larger length of the hinge strap, the lid is also completely displaced from the inflating space by the air bag when the air bag is triggered. The course of the hinge strap, when the air bag retaining device is not triggered, also contributes thereto. If the hinge strap is at least partially between the air bag retaining devices and the lid, the inflating air bag comes in contact with the hinge strap which was tensioned after a short time, which contact advantageously accelerates the lid opening movement.

Because of the linking according to the invention in conjunction with the inflation of the air bag, the opening movement of the lid advantageously takes place to a large part as a translational movement and with little rotation. The lid is displaced in a parallelogram-type manner with an effect which is similar to over-dead-center kinematics.

The position of the hinge strap at least partially between the air bag retaining device and the lid also contributes to a simple mountability of the lid. The lid can easily be closed from the motor vehicle interior. The hinge strap will then automatically be situated between the air bag retaining device and the lid.

In an advantageous embodiment of the invention, the lid is mounted to a steering wheel. As a result, in the case of an air bag retaining device for a steering wheel, the connection of the lid is easily mountable and the inflation of the air bag is not hindered by the covering.

In another advantageous embodiment of the invention, the lid for closing an opening is mounted in the dashboard. The gas retaining device consists of an air bag module behind the dashboard. Here, the above-mentioned advantages are utilized for a front passenger air bag. In this case, it is also found to be advantageous that the translational opening movement helps to prevent the lid from coming into contact with the windshield and the latter is therefore protected from destruction. For this reason, in addition to the hinge strap, no catch bands, which further limit its moving path, are required for the cover.

In a preferred embodiment of the invention, the hinge strap is form-lockingly connected with the lid. Such a form-locking connection between the hinge strap and the lid has the advantage that very large forces can act upon the covering which are then transmitted from the hinge strap by way of the fastening point to the vehicle body.

In another preferred embodiment of the invention, the lid consists of at least one dimensionally stable core and at least one padding layer and the hinge strap is connected with the covering in that it is guided through recesses of the core and is at least partially surrounded by the padding layer.

Such a connection between the core and the hinge strap of the covering has the advantage that its stability is particularly high, in particular in the tension direction of the hinge straps. The covering is therefore reliably held back by the hinge strap and nevertheless has a simple construction.

In another advantageous embodiment of the invention, the hinge strap is form-lockingly connected at one end with the core and is guided in the direction of its other end situated outside the padding layer through the recesses of the core. This has a particularly favorable influence on the flux of force.

In another advantageous embodiment of the invention, during the holding-back of the covering, a very favorable flux of force is created if at least two hinge straps are used in an essentially parallel arrangement for holding the lid. As a result, the lid is guided better on its moving path in the transverse direction of the vehicle and the hinge straps are better protected against breakage.

In another preferred embodiment of the invention, at least one additional hinge strap or the hinge strap is guided, by means of its one end on a half of the lid situated closer to the windshield on a side of the lid facing away from the motor vehicle interior, out of this lid and is mounted at a vehicle-body-side fastening point on the motor vehicle.

Due to this linking of the lid with one outlet point of a hinge strap respectively on the upper and the lower half of the lid, its opening movement in conjunction with the inflation of the air bag takes an even more favorable course. The lid is guided even more securely during its translational movement and the rotation of the lid is prevented even more. In addition, the effect of the over-dead-center kinematics is intensified.

In another advantageous embodiment of the invention, at least one hinge strap is fastened by being looped at one end around a bow, the bow being connected with the core.

Such a bow, which has, for example, a rod-shaped or tube-shaped construction and is screwed to the core from below, has the advantage that, in the case of air bag coverings with a foil-type foam-backing, the hinge straps can be mounted after the foaming process. As a result, no marks will occur on the body shell. Furthermore, the sealing-off of the foaming tool is facilitated with respect to an outflow of foam. In addition, air bag coverings can be formed in the case of which only foil is glued to the cores.

Other objects, advantages and novel features of the present invention will become apparent from the following detailed description of the invention when considered in conjunction with the accompanying drawings.

DETAILED DESCRIPTION OF THE DRAWINGS

Figure 1:
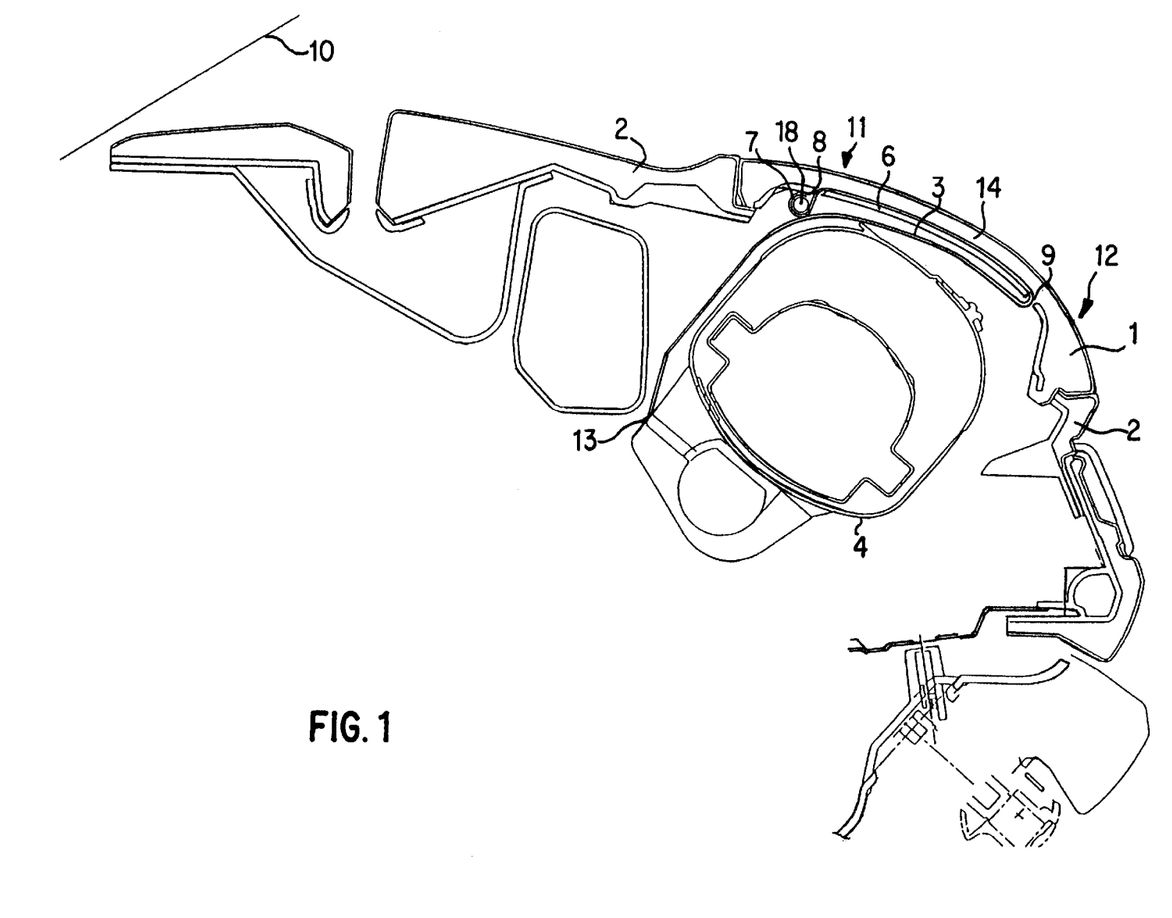
FIGS. 1 to 3 are partial cross-sectional views of a first embodiment of an air bag retaining device installed in a dashboard of a motor vehicle showing the deployment of the air bag at three different points in time.

FIG. 1 is a cross-sectional view of a lid for an air bag retaining device in a dashboard 2 of a motor vehicle in the closed position. The lid 1 is used for closing an opening in the dashboard 2 and, after the triggering of an air bag module 4, is pushed open toward a motor vehicle interior by an air bag 5 illustrated in FIGS. 2 and 3. The lid 1 is held by means of a hinge strap 3 at least along a partial course of its opening movement on a defined moving path. For this purpose, the hinge strap 3 is connected at one end 7 with the lid 1 and is fixed at the other end 13 to the body of the motor vehicle, here to the air bag module 4.

Being movably inserted in the dashboard 2, the lid 1 is situated in the dashboard 2 in the area in front of an unoccupied front passenger seat. The hinge strap 3 made of a woven-fabric strap is mounted at one end 7 in a form-locking manner on a dimensionally stable core 6 embedded in a padding layer 14 which surrounds the core 6 toward the motor vehicle interior. The core 6 has two recesses 8, 9 for the hinge strap 3 through which the hinge strap 3 is guided. In this case, one end 7 of the hinge strap 3 is form-lockingly fixed to a bow 18 which, in turn, is form-lockingly connected with the core 6, specifically on a half 11 of the lid 1 which is situated closer to a windshield 10. At its two ends, the bow 18 also extends through the core 6 and is form-lockingly fixed to the core 6 by way of invisible projections, not shown. For the form-locking connection between the hinge strap 3 and the bow 18, one end 7 of the hinge strap 3 is looped around the bow 18 and is sewn together to form splice strap, not shown in further detail.

Starting from the end 7 of the hinge strap 3, the hinge strap 3 extends through the recess 8 into the padding layer 14 of the lid 1 and farther on the side of the core 6 pointing toward the motor vehicle interior, cast in by the padding layer 14 together with the core 6, to the next recess 9 and through this recess 9 to the side of the core 6 which points toward the air bag module 4. The recess 9 is situated on a half 12 of the lid 1 which is farther removed from the windshield 10 than the half 11. The recess 9 is the outlet point of the hinge strap 3 from the lid 1. From there, the hinge strap 3 returns, passing through between the air bag module 4 and the lid, in the direction of the windshield 10 to its fastening point fixed to the vehicle body at its other end 13.

Figure 2:
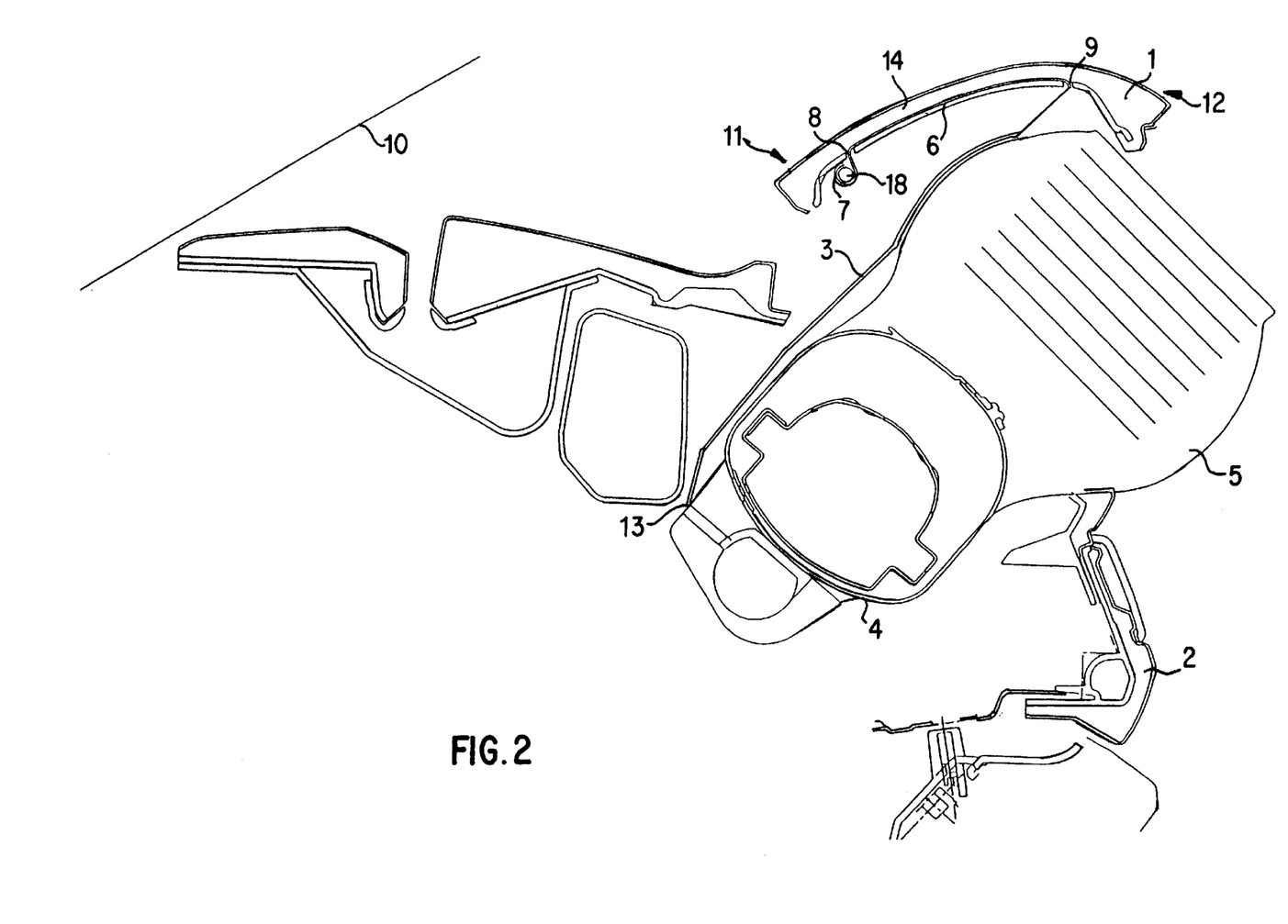

FIG. 2 shows the air bag 5 in a partially inflated condition. It has already pushed open the lid 1 toward the motor vehicle interior and accelerated in the direction of the windshield 10 until the hinge strap 3, which is now tensioned, determines its moving path with respect to the vehicle body. The hinge strap 3 is supported on the air bag 5 which, together with the position of the outlet point of the hinge strap 3 out of the lid 1, results in a parallelogram-type moving path of the lid 1.

Figure 3:
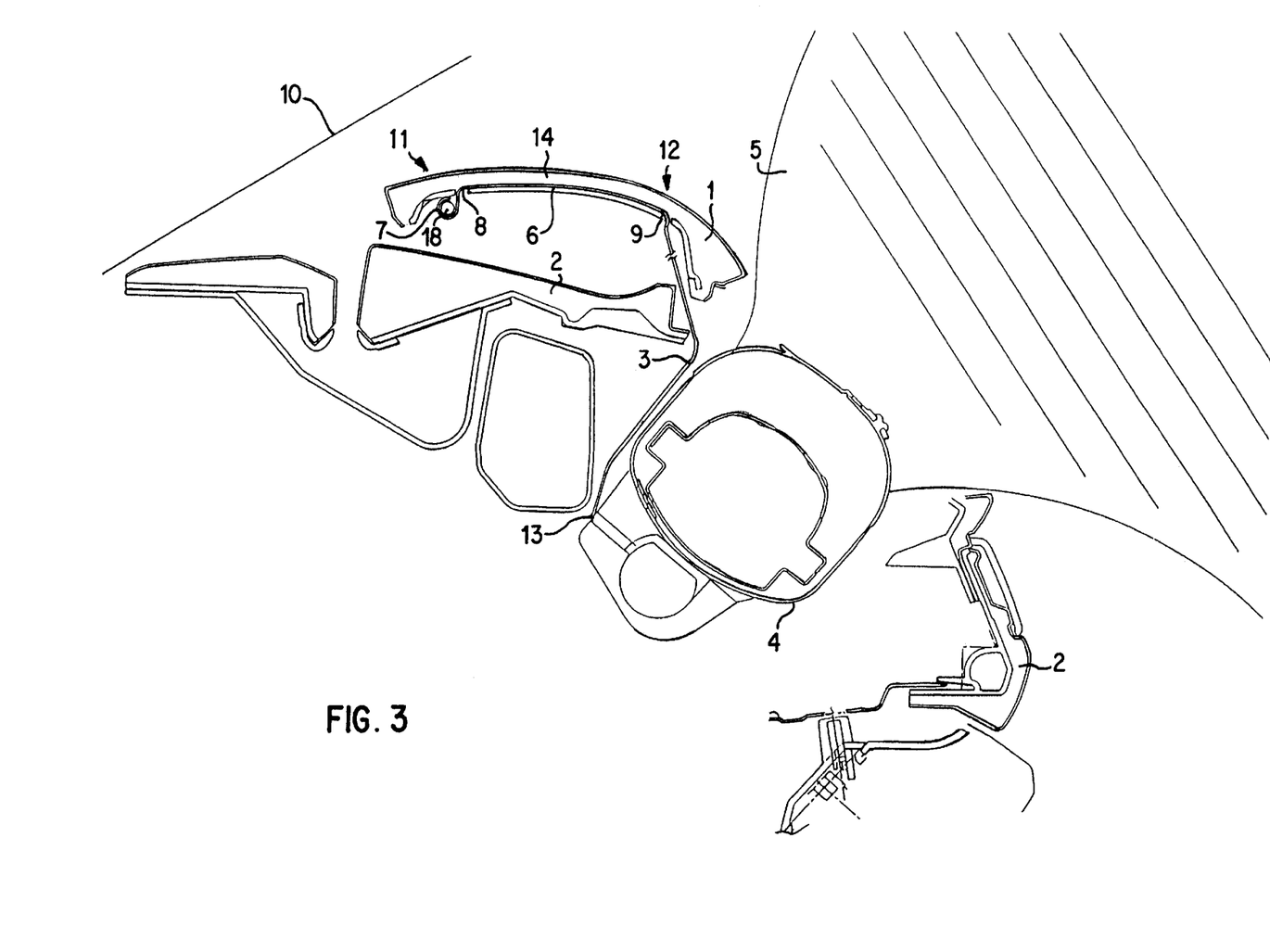

FIG. 3 shows the position of the lid 1 when the air bag 5 is fully inflated. The lid 1 is disposed on the dashboard 2 in essentially the same orientation as shown in FIG. 1, but displaced out of the path of the inflated air bag 5. The opening movement of the lid 1 therefore consisted predominantly of translational movement components. This opening movement also prevents the lid 1 from contracting the windshield 10, which under certain circumstances would result in a destruction of the windshield 10.

Figure 4:
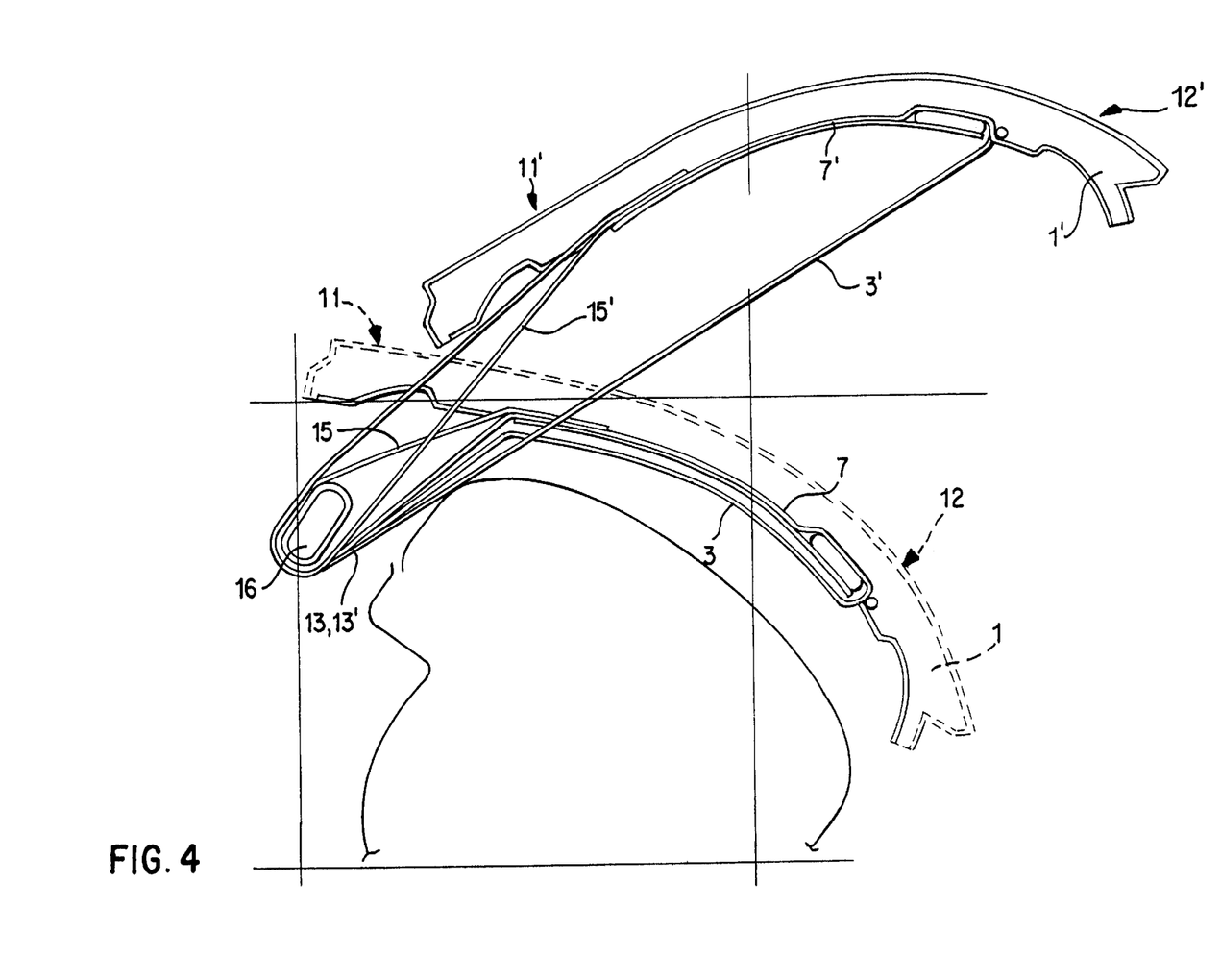
FIG. 4 is a cross-sectional view of a second embodiment of an air bag retaining device with two outlined lid positions which, among others, are taken up by the lid during the deployment of the air bag.

FIG. 4 shows the lid 1, 1' in two positions; in a closed position which closes off the opening of the dashboard not shown here, and in a half-opened position (same reference numbers, but having an apostrophe (')). The air bag is also not shown. This figure has the purpose of illustrating a variant with respect to the linking of the lid 1, 1' by way of hinge straps 3, 3'. The lid 1, 1' is held on its moving path by way of the hinge strap 3, 3' and another hinge strap 15, 15'. The hinge strap 3, 3' illustrated by a dash-dotted line, corresponds to the hinge strap 3 from FIGS. 1 to 3 and has its outlet point on the half 12, 12' of the lid 1, 1' farther removed from the windshield not shown here. The additional hinge strap 15, 15' has its outlet point from the lid 1, 1' on the half 11, 11' of the lid 1, 1' which is closer to the windshield. The hinge strap 3, 3' as well as the additional hinge strap 15, 15' are mounted to the vehicle-body-side fastening point which is a cross member 16. The additional hinge strap 15, 15' is looped around this cross member 16 and is fastened via its two ends to the lid 1, 1', while the hinge strap 3, 3' is mounted to the cross member 16 only with its other end 13, 13'.

Figure 5:
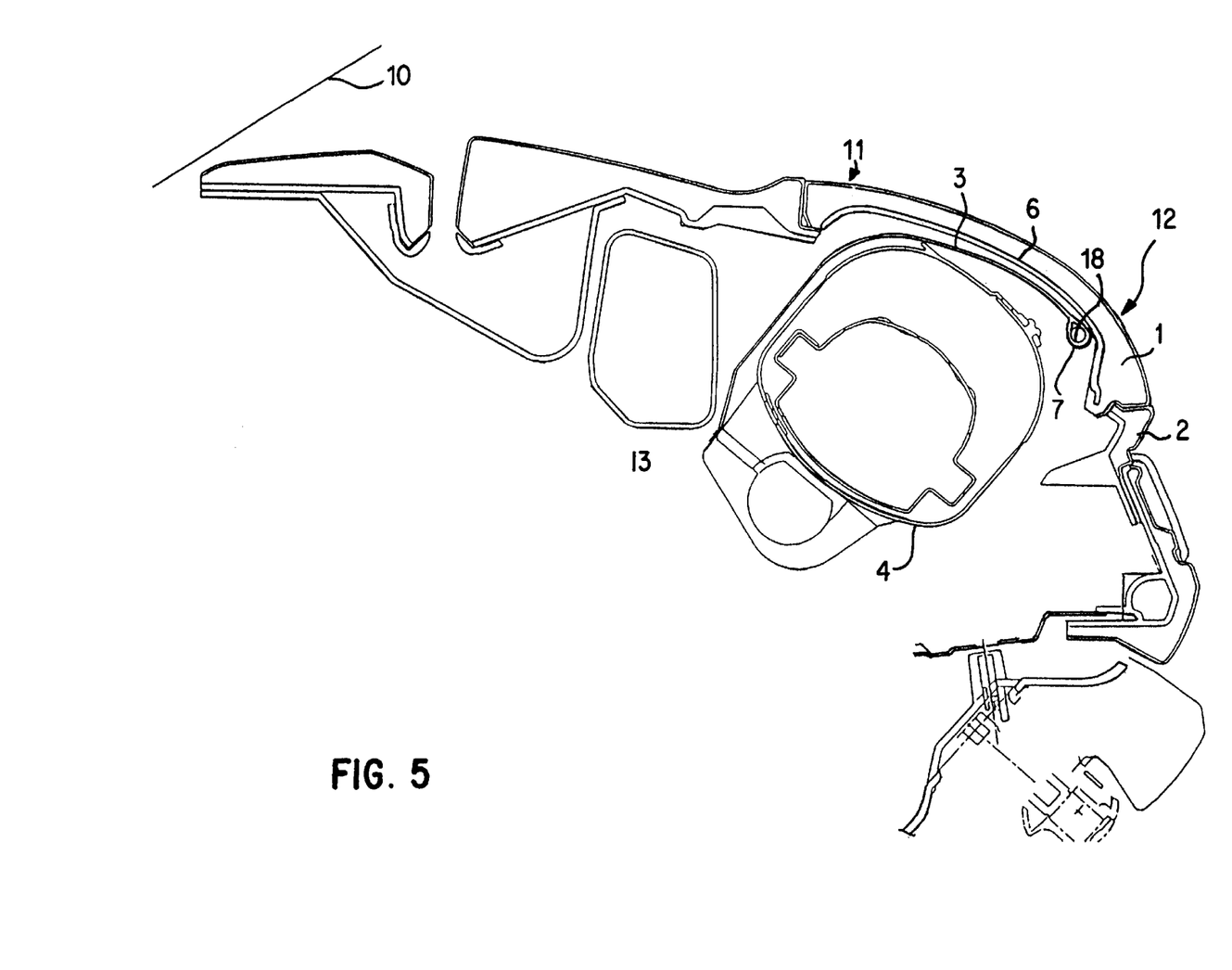
FIGS. 5 to 7 are partial cross-sectional views of a third embodiment of an air bag retaining device again installed in a dashboard of a motor vehicle showing the deployment of the air bag at three different points in time.

FIGS. 5 to 9 show a third embodiment of the invention. In FIG. 5, the lid 1 for the air bag retaining device is situated in the closed position in the dashboard 2 of the motor vehicle. The lid 1 is used for closing the opening in the dashboard 2 and, after the air bag module 4 is triggered, is pushed open toward the motor vehicle interior by the air bag 5 illustrated in FIGS. 6 and 7 and is held by means of the hinge strap 3 at least along a section of its opening movement on a defined moving path. For this purpose, the hinge strap 3 is connected at one end 7 with the lid 1 and is fixed at its other end 13 to the body of the motor vehicle; in this case, to the air bag module 4.

Being removably inserted in the dashboard 2, the lid 1 is situated in the dashboard 2 in the area in front of the unoccupied front passenger seat. The hinge strap 3 made of a woven-fabric strap is form-lockingly fixed at end 7 to the bow 18 which, in turn, is form-lockingly connected with the core 6; specifically in the case of this third embodiment, on the half 12 of the lid 1 which is farther removed from the windshield 10. For the form-locking connection between the hinge strap 3 and the bow 18, the end 7 of the hinge strap 3 is looped around the bow 18 and is sewn together to form a splice strap.

Starting from the bow 18, the mounting point of one end 7 of the hinge strap 3 on the core 6, this hinge strap 3 passes through between the air bag module 4 and the lid 1 in the direction of the windshield 10 to its vehicle-body-fixed fastening point at its other end 13.

Figure 6:
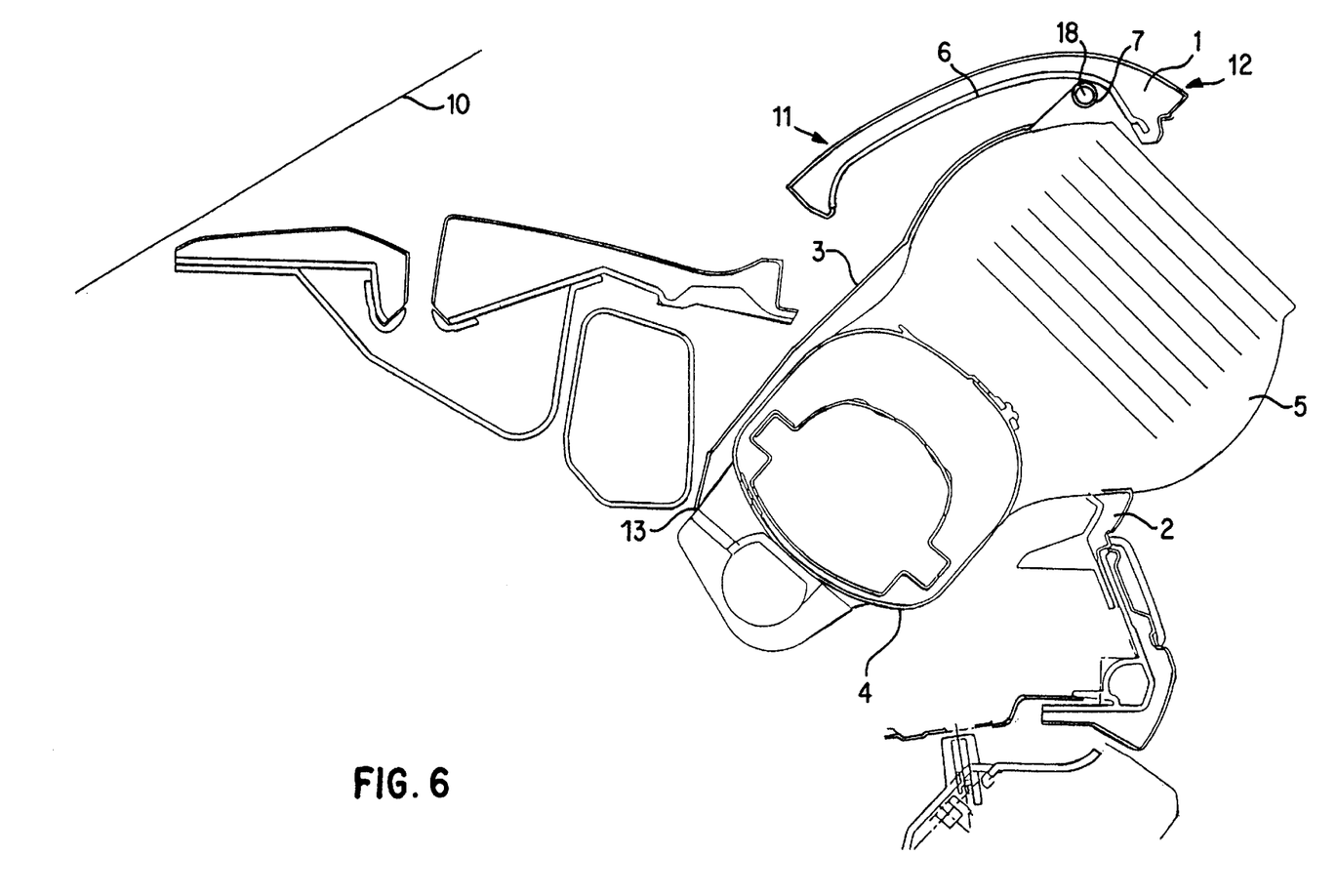

FIG. 6 shows the air bag 5 in its partially inflated condition. It has already pushed open the lid 1 toward the motor vehicle interior and accelerated in the direction of the windshield 10 until the hinge strap 3, which is now tensioned, determines its moving path with respect to the vehicle body. The hinge strap 3 is supported on the air bag 5 which, together with the position of the outlet point of the hinge strap 3 on the lid 1, results in a parallelogram-type moving path of the lid 1.

Figure 7:
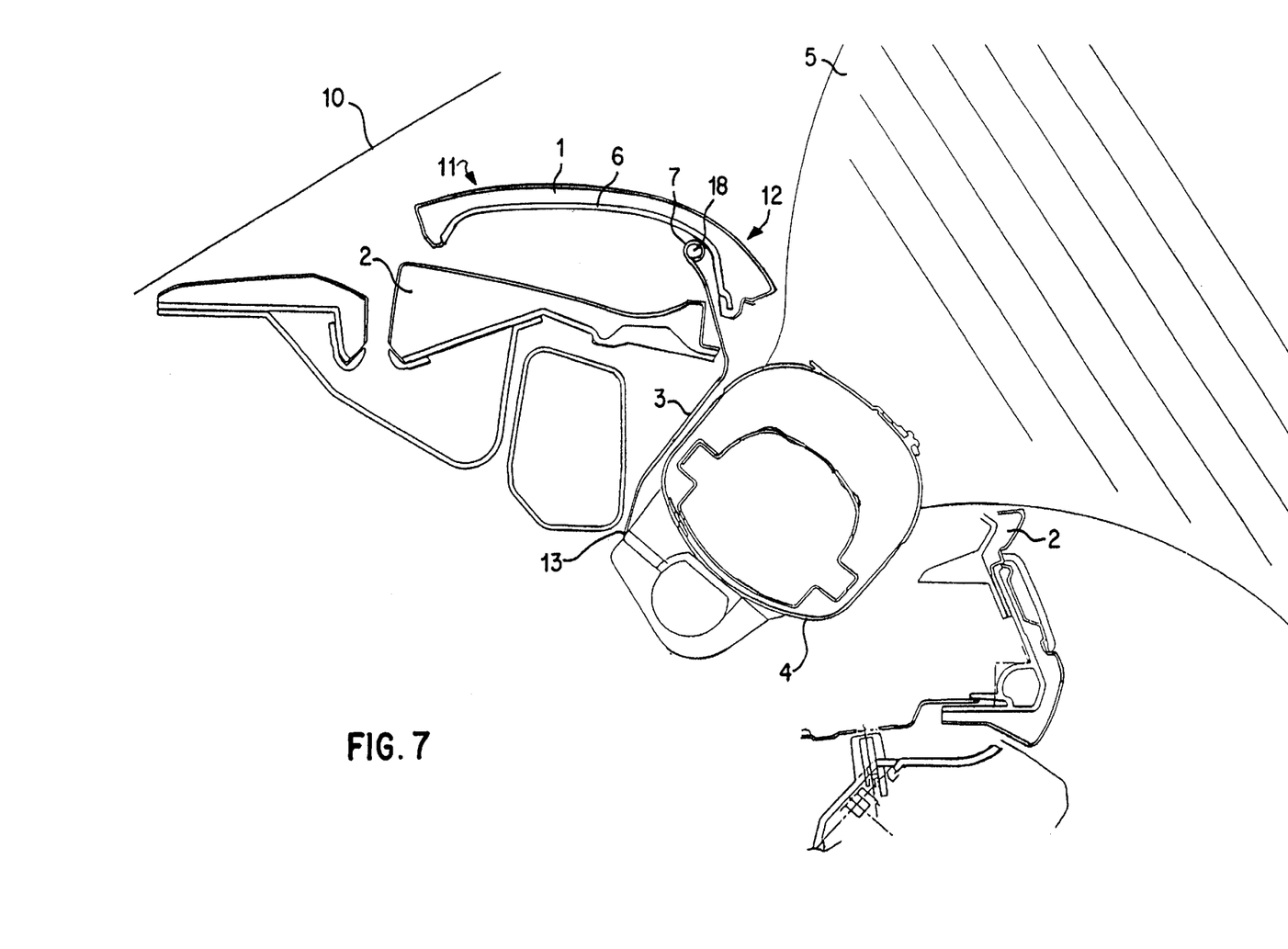
Figure 8:
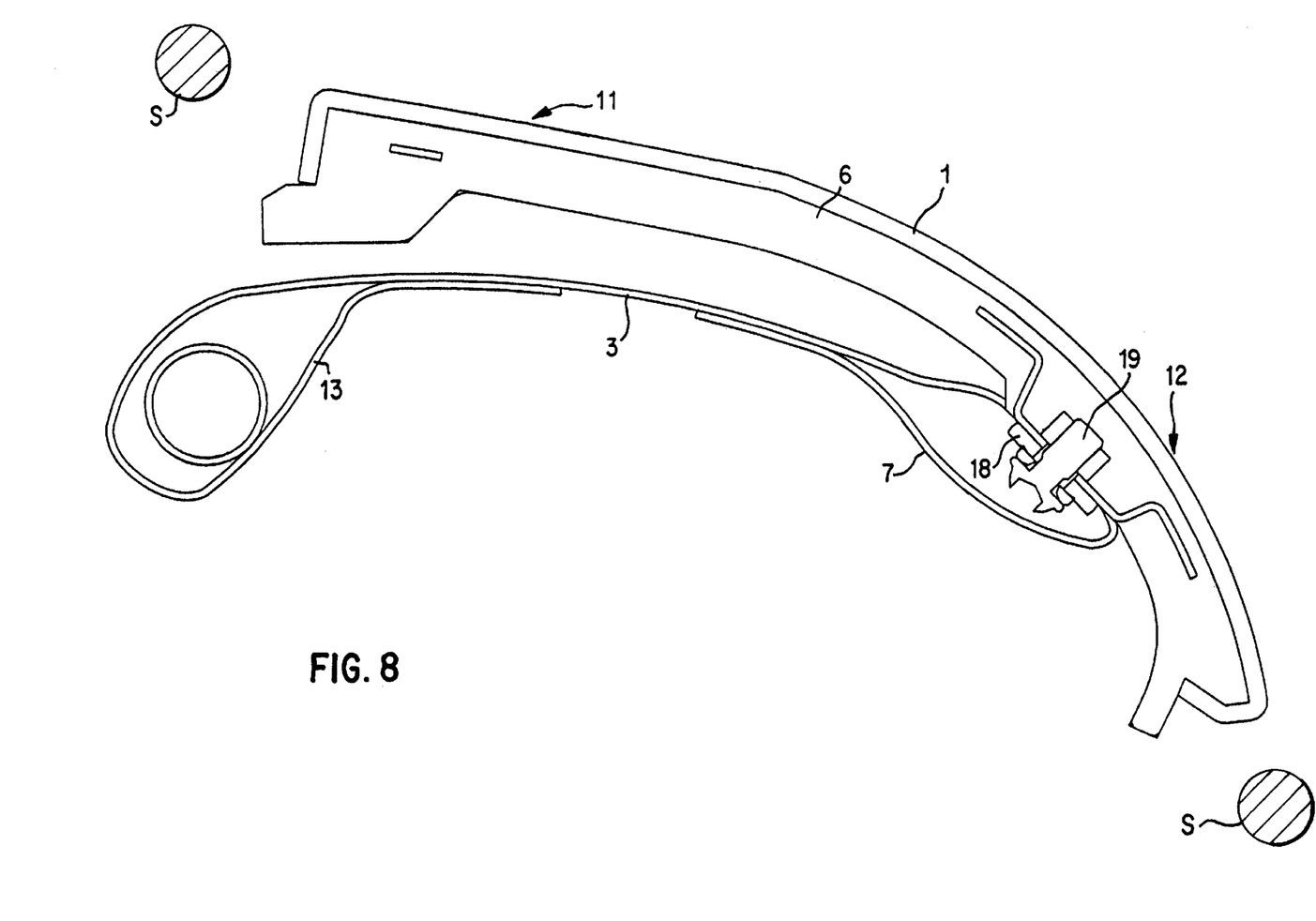
FIG. 8 is a cross-sectional view of a lid for closing an opening in the dashboard corresponding to the third embodiment.

FIG. 7 shows the position of the lid 1 when the air bag 5 is fully inflated. The lid 1 is disposed on the dashboard 2 in the same orientation but displaced, from the closed position shown in FIG. 1. The opening movement of the lid 1 therefore consisted predominantly of translational movement components. This opening movement also prevents contact between the lid 1 and the windshield 10, which under certain circumstances would result in a destruction of the windshield 10.

FIG. 8 again is a more detailed illustration of the lid 1 with the hinge strap 3 corresponding to a third embodiment. On the side of the lid 1 facing the air bag module, which is not shown here, the bow 18 is fastened to the core 6 with screws 19. Looped around the bow 18, one end 7 of the hinge strap 3 is sewn together to form a splice strap. From here, the hinge strap 3 passes through between the air bag module 4 and the lid in the direction of the windshield 10 (FIGS. 5 to 7) to a vehicle-body-fixed fastening point on its other end 13 with which, also looped around the latter, it is sewn together to form another splice strap. A steering wheel S is also schematically represented in FIG. 8.

Figure 9:
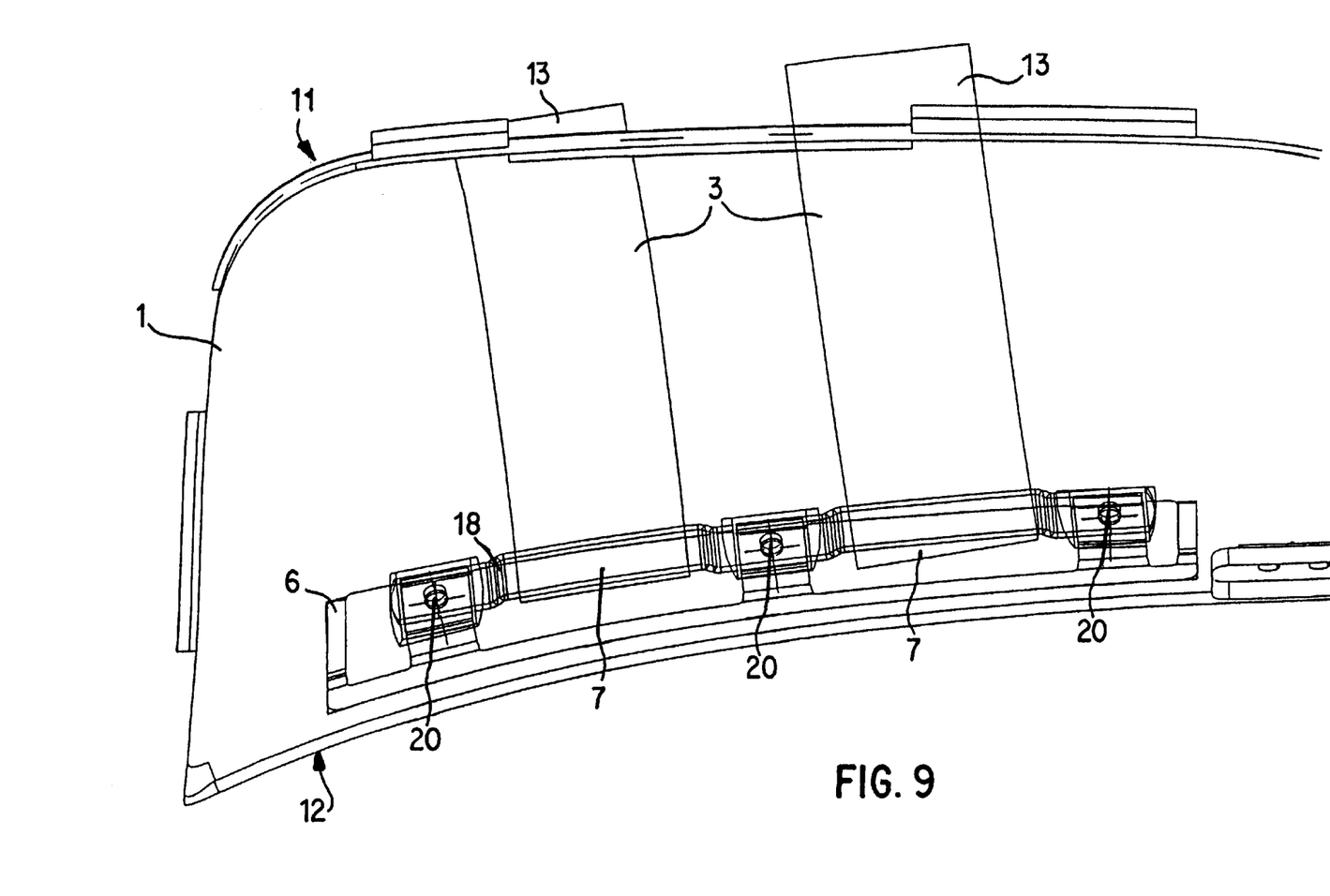
FIG. 9 is a partial view of the lid of FIG. 8 from below.

FIG. 9 is a view of the lid 1 from below, of the side of the lid 1 facing the air bag module 4 which is not shown here. The bow 18 is fastened at fastening points 20 to the core 6 by means of three screws 19 which are not outlined here. Looped around the bow 18, two hinge straps 3 are fastened to the bow 18, being sewn together to form one splice strap respectively. The fastening point of the bow 18 on the core 6 is situated on the half 12 of the lid 1 which is farther removed from the windshield 10 (FIGS. 5 to 7).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Covering for an air bag retaining device of a motor vehicle, comprising:

a structure defining an opening behind which the air bag retaining device is to be mounted, said structure being located proximate a windshield of the vehicle;

a lid arranged to cover said opening in a closed position, said lid to be displaced from said closed position by an air bag to be inflated from the air bag retaining device; and at least one hinge strap coupled to the lid and coupled to a fixed location behind said opening, wherein when the lid is in said closed position, the hinge strap extends between the air bag retaining device and the lid to an outlet point or to a mounting point on the lid, wherein said point on the lid, viewed essentially in a longitudinal direction of the vehicle, is situated (1) on a first half of the lid which is located farther removed from the windshield than a second half of the lid and (2) on a side of the lid facing away from a motor vehicle interior, and wherein at least one bow is connected with the lid and wherein said at least one hinge strap is fastened to the bow.

2. Covering according to claim 1, wherein the structure defining the opening is a dashboard, and the air bag retaining device is an air bag module behind the dashboard.

3. Covering according to claim 1, wherein the at least one hinge strap is fixed at one end with the bow, and extends from said one end through a recess forming the outlet point.

4. Covering according to claim 1, wherein at least two hinge straps are connected with the lid in an essentially parallel arrangement.

5. Covering according to claim 1, wherein said structure is a dashboard.

6. Covering according to claim 1, wherein said structure is a steering wheel.

7. Covering according to claim 1, wherein said fixed location is a portion of said air bag retaining device.

* * * * *